C. SMITH.
AUTOMATIC MACHINE FOR MAKING FRAMES FOR WREATHS.
APPLICATION FILED APR. 15, 1919.

1,351,009.

Patented Aug. 24, 1920.
4 SHEETS—SHEET 1.

Witnesses
Fred A. Swett.
Arthur A. Rhodes.

Inventor
By Charles Smith
Henry Marok Jr.
Atty.

C. SMITH.
AUTOMATIC MACHINE FOR MAKING FRAMES FOR WREATHS.
APPLICATION FILED APR. 15, 1919.
1,351,009. Patented Aug. 24, 1920.
4 SHEETS—SHEET 2.
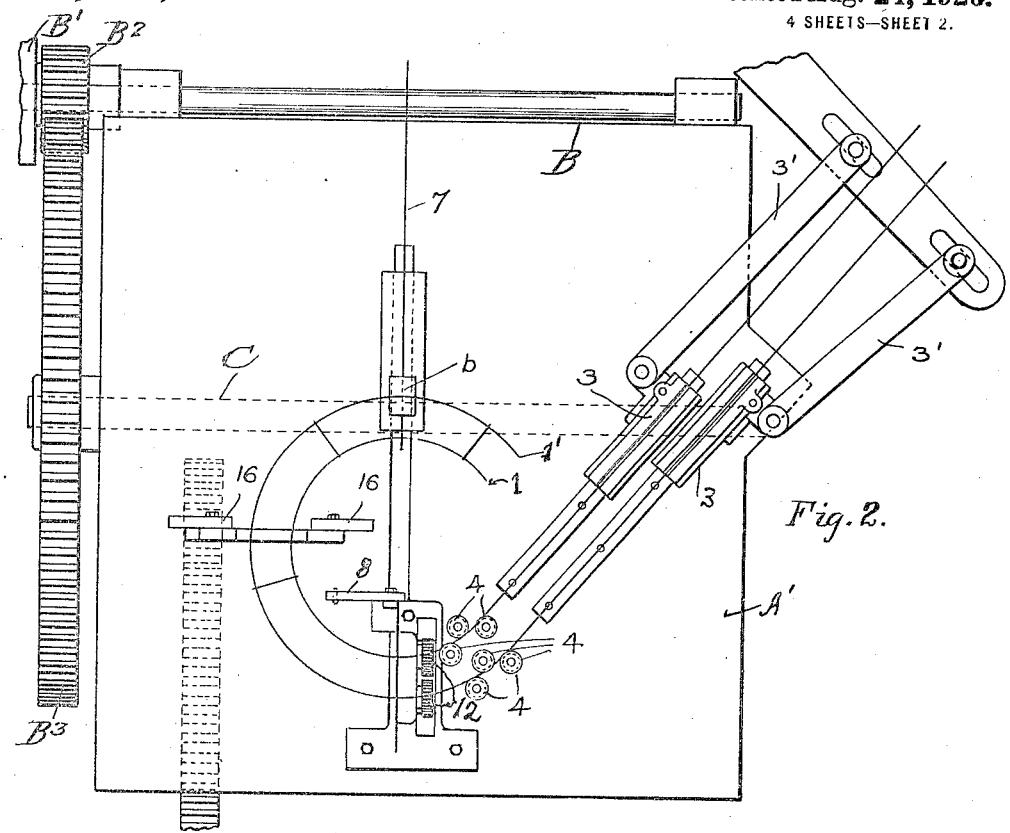
Fig. 2.
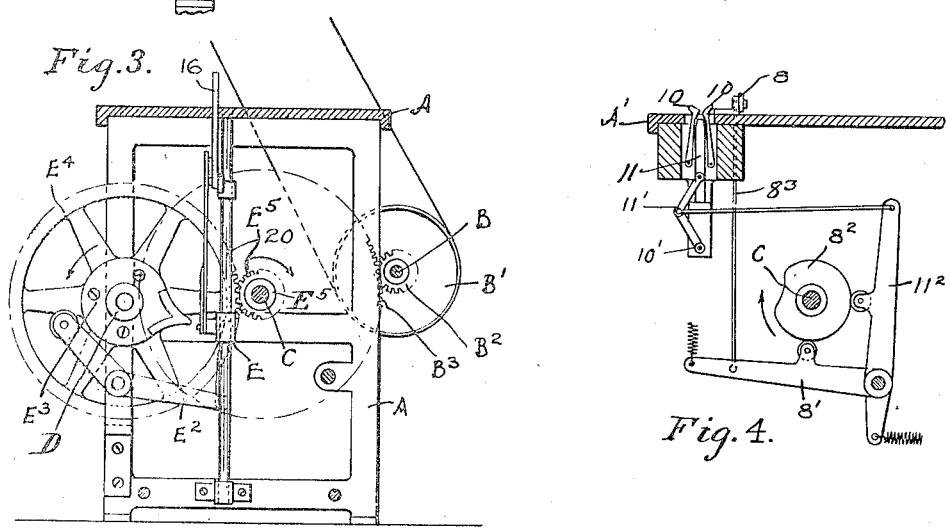
Fig. 3.
Fig. 4.
Witnesses
Fred A. Swert
Arthur A. Rhodes
Inventor
Charles Smith
By Henry Marsh Jr.
Atty.

C. SMITH.
AUTOMATIC MACHINE FOR MAKING FRAMES FOR WREATHS.
APPLICATION FILED APR. 15, 1919.

1,351,009.

Patented Aug. 24, 1920.

Witnesses
Fred A. Sweet.
Arthur A Rhodes

Inventor
By Charles Smith
Henry March Jr.
Atty.

C. SMITH.
AUTOMATIC MACHINE FOR MAKING FRAMES FOR WREATHS.
APPLICATION FILED APR. 15, 1919.
1,351,009. Patented Aug. 24, 1920.
4 SHEETS—SHEET 4.
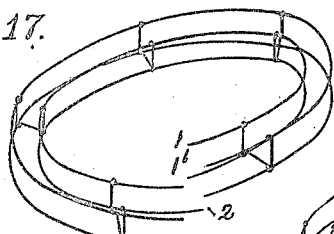
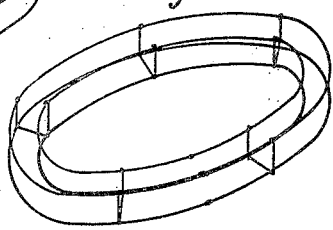
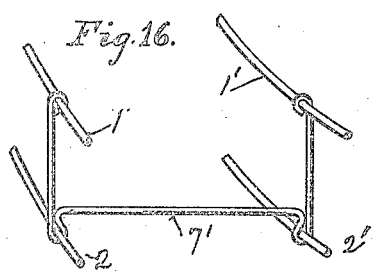
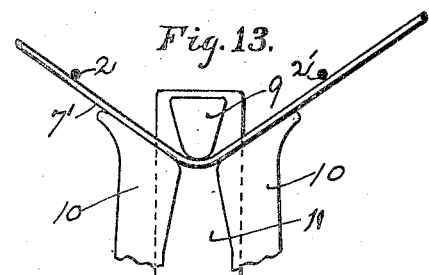
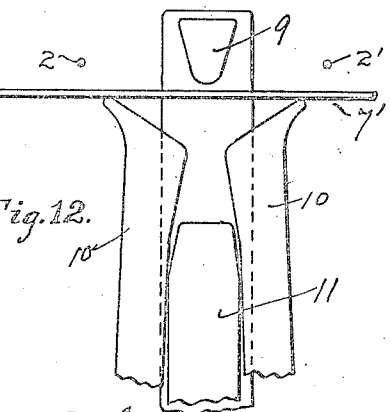
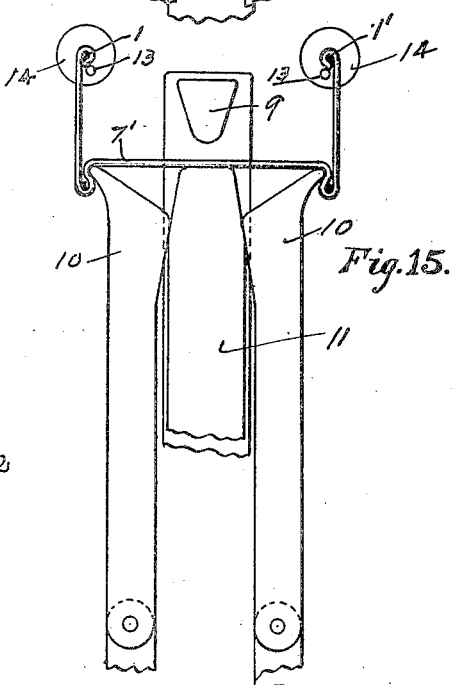
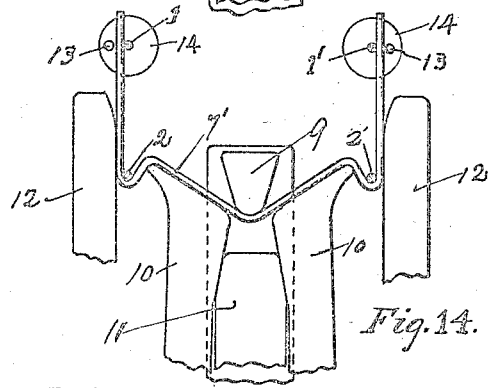
Witnesses
Fred A. Sweet
Arthur A. Rhodes
Inventor
Charles Smith
By Newry March Jr.
Atty.

UNITED STATES PATENT OFFICE.

CHARLES SMITH, OF PROVIDENCE, RHODE ISLAND.

AUTOMATIC MACHINE FOR MAKING FRAMES FOR WREATHS.

1,351,009.  Specification of Letters Patent.  Patented Aug. 24, 1920.

Application filed April 15, 1919. Serial No. 290,342.

*To all whom it may concern:*

Be it known that I, CHARLES SMITH, a citizen of the United States, residing in the city and county of Providence and State of Rhode Island, have invented a new and useful Automatic Machine for Making Frames for Wreaths, of which the following is a specification.

The purpose of my invention is to provide a machine which will automatically, speedily and inexpensively shape a plurality of strands of wire into a rigid circular skeleton frame of rectangular cross section upon which the material of which a wreath is to be composed can be easily secured.

To this end my invention consists in the new and novel construction, combination and arrangement of parts hereinafter described and illustrated in the accompanying drawings, in which,—

Fig. 2 is a plan view of the same.

Fig. 3 is an end elevation of my machine.

Figs. 4, 5, 6, 7, 8 and 9 are detail views of my device for bending the cross or reinforcing wires of the wreath frame.

Fig. 12, 13, 14 and 15 illustrate different steps of the cross wire bending and fastening operation.

Fig. 16 is an enlarged view of the cross wire in its completed state, and showing also its relation to the main wires of the wreath frame.

Fig. 17 is a perspective view of the wreath frame as it leaves the machine.

Fig. 18 is a similar view of the completed wreath frame.

Like reference letters and numerals indicate like parts where they occur in the drawings.

Figure 1:
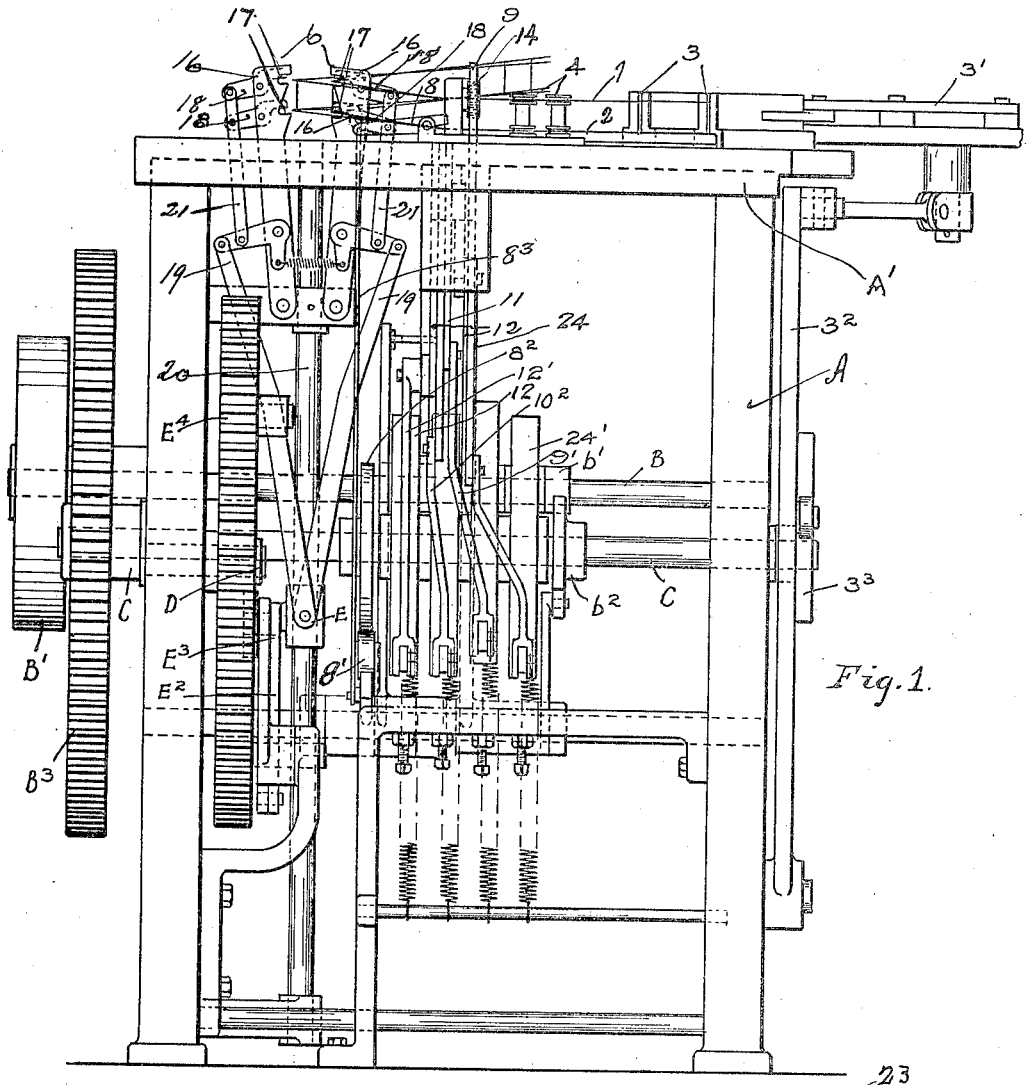
Figure 1 is a front elevation of my newly invented machine.

In the drawings I have shown my wreath frame machine as embodying for concurrent action and operation means for feeding four strands of wire (which I term the main wires) into the machine simultaneously in pairs disposed a distance apart in both directions with one pair immediately above the other pair to thereby form a skeleton of rectangular cross section; means for bending said main wires into concentric circular or ring forms to thereby form a circular skeleton body of rectangular cross section; means for cutting said main wires simultaneously at a common point upon the completion of their ring-like formation; means for feeding a single strand of wire (which I term the cross wire) into the machine at right angles to said main wires and below the lower pair of the latter; means for cutting said cross wire into pieces of predetermined length at intervals timed relatively to the forward movement of the main wires so that said pieces will underlie the lower pair of main wires and at regulated distances apart from each other; means for bending said pieces successively into firm engagement with all said main wires to thereby form cross braces strengthening said frame and disposed at right angles to said main wires and spaced at uniform distances apart thereon; and means for actuating the whole for conjoint action.

A represents the frame of my machine, and $A^1$ the table of the same. B represents the drive shaft and C the cam shaft, both of which are mounted on the frame in the usual way. Other parts of the mechanism are mounted either on the table or on the shafts.

Figure 11:
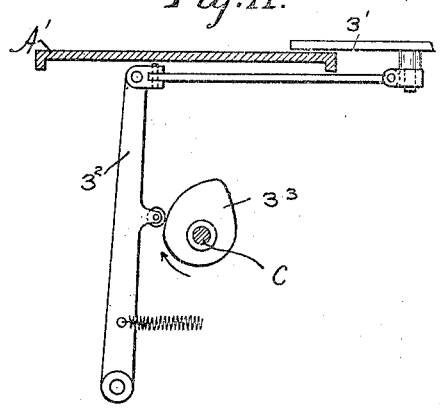
Fig. 11 is a similar view of the main wires feed.

The main wires feeding system comprises reciprocating tension jaws 3, 3, links $3^1$, $3^1$, the spring controlled lever $3^2$ and its actuating cam $3^3$ carried on the cam shaft C, all arranged and adapted to feed the four main wires into and through the machine. (Figs. 1, 2, 11).

The main wires bending system comprises staggered rolls, 4, 4, each provided with an annular groove at each end, said rolls vertically mounted in oppositely disposed sets on the table $A^1$ in line with and in advance of the main wire feed jaws 3, 3, and arranged and adapted, as said main wires are fed through them in parallel pairs spaced a distance apart with one pair immediately above the other pair, to bend said wires concurrently into concentric rings to thereby form a circular skeleton body of rectangular cross section, the respective grooves being each engaged by one of said wires.

Figure 10:
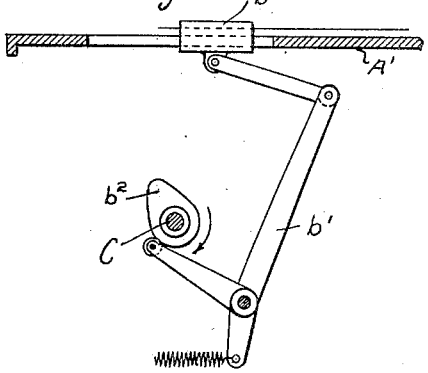
Fig. 10 is a detail view of the cross wire feed.

The cross wire feeding system comprises the reciprocating tension jaw $b$ mounted on the table $A^1$ a distance from and axially at right angles to the feed path of the main wires 1, $1^1$, 2, $2^1$, (Fig. 2), is, by a spring controlled lever $b^1$ in turn actuated by a cam $b^2$ carried on the cam shaft C (Fig. 10), actuated to feed the cross wire 7 along until its free end underlies the lower pair 2, $2^1$, of the main wires, when a piece $7^1$, of sufficient length to be bent up into contact with all four main wires, is by the cutter 8 cut off, and this operation is repeated at regular fixed intervals during the forward movement of the main wires. Each piece $7^1$ is successively bent up around all said main wires by the cross wire bending system hereinafter described, to thereby form stiffening cross braces for the wreath frame, spaced a uniform distance apart thereon.

The cross wire cutting system comprises a shear or cutter 8 pivotally mounted on the table $A^1$ across and at practically a right angle to the path of the cross wire 7 and a distance to one side and in advance of the bending rolls 4, 4 (Figs. 1, 2) and connected by the rod $8^3$ with a spring controlled lever $8^1$ which is actuated by a cam $8^2$ carried on the cam shaft C. (Figs. 1, 2, 4.) The movement and action of said parts is timed relatively to the movements of the main wires and cross wire feed so that at regular intervals a piece $7^1$ will be cut from the free end of the cross wire 7 and disposed in position to allow it to be bent up into a cross brace for the wreath frame, and this operation is repeated until the required number of pieces $7^1$ have been cut off from the end of the cross wire 7.

Figure 9:
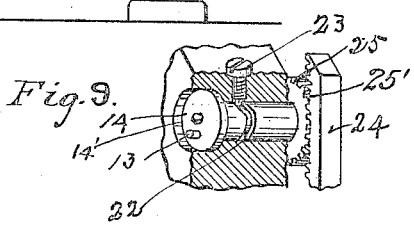
Figure 5:
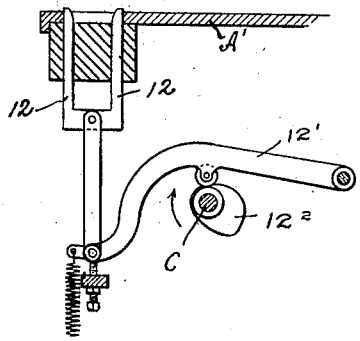
Figure 6:
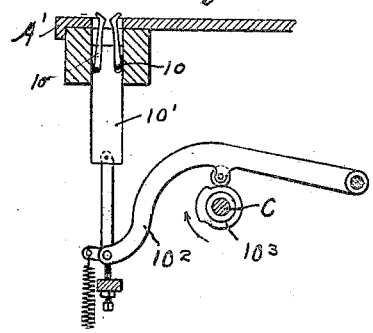
Figure 7:
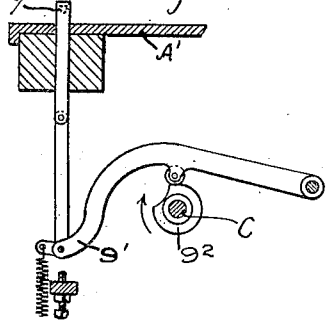
Figure 8:
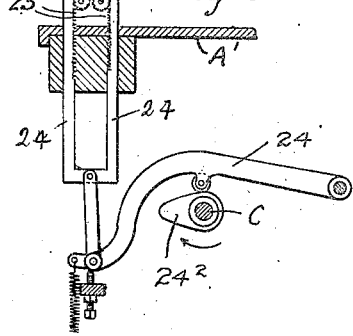

The cross wire bending system comprises the vertically reciprocating laterally separable V-shaped jaws 10, 10, pivotally mounted on and carried by the vertically reciprocating member $10^1$ operatively connected with and operated by a spring controlled lever $10^2$ in turn actuated by a cam $10^3$ carried on the cam shaft C, (Figs. 1, 4, 6); a vertically reciprocating die 9 carried on the member $10^1$ positioned above and operating between the jaws 10, 10, is actuated by a spring controlled lever $9^1$ in turn actuated by a cam $9^2$ on the cam shaft C (Figs. 1, 7); a vertically reciprocating spreader 11 positioned and operating between the jaws 10, 10, and alined with the die 9 is actuated by toggles $11^1$ operatively connected with a spring controlled lever $11^2$ actuated by a cam $8^2$ carried on the cam shaft C. (Figs. 1, 4). Said spreader 11, jaws 10, 10, and die 9 are arranged and timed relatively to each other and are thereby adapted to first bend the mid portion of the piece $7^1$ downward into V-shape (Fig. 13) and then to straighten said mid portion and crimp said piece $7^1$ around the lower pair, 2, $2^1$, of main wires (Figs. 14, 15); vertically reciprocating members 12, 12, disposed at the side and parallel with the jaws 10, 10, (Fig. 14) and timed relatively to the movement of the latter and the spreader and die are actuated, by a spring controlled lever $12^1$ and cam $12^2$ carried on the cam shaft C, to turn the free ends of the piece $7^1$ upward against the sides of the main wires (Fig. 14); rotatable disks 14, 14, mounted on the table $A^1$ are each axially bored to permit the passage therethrough of the upper pair 1, $1^1$ of the main wires, and each carrying a laterally projecting pin 13, arranged on the rotation of the disks to engage the free ends of the piece $7^1$ and bend them around the adjacent main wire (Figs. 14, 15) as the disks are rotated by pinions 25, 25, engaging racks 25, $25^1$ carried on the vertically reciprocating members 24, 24, actuated by the spring controlled lever $24^1$ and cam $24^2$ carried on the cam shaft C (Figs. 8, 9, 14, 15). The shaft of each disk 14 is provided with a spirally directed groove 22 engaged by a set screw or pin 23, which on the rotation of the disk shafts impart to the disks endwise reciprocating movements to bring the pins 13 into engagement with the free ends of the piece $7^1$, to bend them around the wires 1, $1^1$ and withdraw them from such engagement when the bending operation is completed (Fig. 9). The described bending the piece $7^1$ into V-shape and then straightening its mid section is for the purpose of enabling it to be bent around the lower pair of main wires 2, $2^1$, by the described action of the spreader 11, jaws 10, 10, members 12, 12 and die 9 (Figs. 12, 13, 14, 15), the die receding as the spreader moves upward (Fig. 15). The described operations are repeated at regular intervals timed relatively to the movements of the four main wires until the required number of pieces $7^1$ have been cut off and bent around the four main wires to form stiffening cross braces to the latter disposed at uniform distances apart on said main wires. (Figs. 17, 18.)

The main wires cutting system comprises oppositely disposed jaws 16, 16, each provided with laterally directed notches 17, 17, adapted on the closing together of said jaws to engage and hold the four main wires 1, $1^1$, 2, $2^1$, while they are being cut by cutters 18, 18, pivotally mounted on said jaws and operatively connected by links 21, with a bell crank pivoted on the depending arms of said jaws, and in turn actuated through links 19 operatively connecting them with a sleeve E vertically slidable on a standard 20 (Fig. 1). Said sleeve E is actuated by a lever $E^2$ connecting it with a cam $E^3$ carried on a gear $E^4$ in turn carried on a stud D and meshing with a gear $E^5$ carried on the cam shaft C. (Figs. 1, 3). The notches 17, in one jaw 16, register with the corresponding notches 17 in the opposite jaw when the two jaws are moved inward to contact with each other, and the cutters 18 register with their adjacent respective notches when operating to cut the main wires. Upward movement of the sleeve E causes the jaws 10, 10, to move inwardly toward each other until the main wires are engaged holdingly by the notches 17. Continued upward movement of the sleeve L causes the cutters 18, to move downward and cut the four main wires simultaneously at a common point. The described operation of the jaws 10, 10, and cutters 18, 18, takes place when the four main wires 1, 1¹, 2, 2¹, have been fed along to complete a circle, the pieces 7¹ having in the meantime been secured, as described, as cross braces engaging the four main wires, and disposed at uniform distances apart on the latter. (Fig. 17). The free ends of the respective wires are then soldered or welded together and I have the completed wreath frame of circular skeleton form and rectangular cross section. (Fig. 18).

The drive shaft B carries a belt pulley B¹ by which it is driven and a gear B² meshing with a gear B³ carried on the cam shaft C to actuate the latter and the several cams carried thereon and connected operatively with the respective systems of mechanism hereinbefore described. (Figs. 1, 3).

In the practical operation of my invention the four main wires, 1, 1¹, 2, 2¹, coiled on their respective reels (not shown) located outside of the machine are led, in parallel pairs spaced a distance apart with one pair immediately above the other pair in the form of a skeleton of rectangular cross section, and are engaged by the main wire feed jaws 3, 3, and by them fed along to and through the bending rolls 4, 4, by which they are bent into circular skeleton form still of rectangular cross section, and are thus fed along until their free ends are returned upon the main wires to form concentric circles. (Figs. 1, 17). In the mean time a single wire 7 is led from its reel (not shown) located outside the machine, and is engaged by the cross wire feed jaw b by which it is fed along until it underlies the lower pair 2, 2¹, of the main wires at substantially a right angle thereto, and in front of the bending rolls 4, 4. Said cross wire feed movement is timed relatively to that of the main wires. The free end of the cross wire is by the cutter 8 positioned forward of the rolls 4, 4, cut to form a piece 7¹ of sufficient length to be bent into engagement with all four main wires to form cross bases to the latter. The cutting off of a piece 7¹ from the end of the cross wire is timed at regular intervals so that such pieces may be bent successively into engagement with the main wires and spaced at uniform distances apart on said main wires. As each piece 7¹ is cut off it is first bent as to its mid portion into V-shape by the die 9 operating downward between the jaws 10, 10 (Fig. 13). The spreader 11 then moves upward, the die 9 receding, and separates the jaws 10, 10, straightening the mid portion of the piece 7¹, and causing said jaws to bend the piece 7¹ into engagement with the lower pair 2, 2¹ of the main wires, which by the upward movement of the members 12, 12, are held between the upwardly turned free ends of said cross piece 7¹. (Figs. 14, 15). The upward movement of the members 12, 12, having turned the free ends of the piece 7¹ up against the upper main wires 1, 1¹, said ends are engaged by pins 13, carried on the disks 14, and bent around said upper main wires. (Figs. 14, 15). These operations are timed relatively to each other and to the feed movements of the main and cross wires and the cross pieces 7¹ are thus succesively bent into engagement with all four main wires and spaced at uniform distances apart thereon. (Fig. 17). After the main wires have been bent into circular form, they are cut by the cutter 8 and are then in the form shown in Fig. 17. Their free ends are then soldered or otherwise secured together to form the completed wreath frame. (Fig. 18).

It is to be understood that I do not limit the scope of my invention to the precise machine shown and described or to the number of wire strands employed to form the frame, as modifications may be made in both respects without departing from the principle of my invention so long as such machine will automatically form a skeleton frame from a plurality of wire strands cross braced by other wire disposed at uniform distances apart on the frame and constructed thereon concurrently with the formation of the frame body.

I claim as my invention and desire to secure by Letters Patent:

1. A wreath making machine of the character described comprising for conjoint action means for feeding a plurality of wire strands into the machine in parallel pairs disposed one pair immediately above the other pair and spaced a distance apart in both directions to thereby form a skeleton of rectangular cross section; means for bending said wire strands into concentric rings to thereby form a circular skeleton of rectangular cross section; means for feeding a single wire into the machine below and at right angles to the lower pair of the first mentioned wires; means for cutting from the free end of said single wire a piece of sufficient length to be bent into engagement with all the first mentioned wire strands, and repeating this operation at regular fixed intervals relative to the movement of the first named wire strands; means for bending said pieces of single wire successively at predetermined intervals into engagement with all the first mentioned wires to thereby form cross braces to the latter disposed thereon at right angles thereto and at uniform distances apart thereon, and means for actuating the whole concurrently; and supporting means, 2. In a machine of the character described the combination of vertically reciprocating laterally spreadable V-shaped jaws; a vertically reciprocating die operating between said jaws; a vertically reciprocating spreader alined with said die and operating between said jaws in opposition to said die; other vertically reciprocating members positioned one at the side of each jaw and parallel therewith; and rotatable disks axially pierced for the passage therethrough of the upper wires of a wreath frame, and carrying laterally projecting pins adapted on the rotation of said disks to bend the ends of a piece of wire around said upper wires, and means for actuating the whole for conjoint operation as and for the purposes specified.

3. In a machine for making wreath frames having means for feeding into the machine a plurality of wires arranged in parallel pairs spaced a uniform distance apart in both directions with one pair immediately above the other pair to thereby form a skeleton body of rectangular cross section, the combination therewith of the described wire bending means, the same comprising oppositely disposed sets of staggered rolls arranged in the feed path of said wires and arranged and adapted to bend said wires concurrently into concentric rings to thereby form a circular skeleton body of rectangular cross section.

4. In an automatic machine for making wreath frames, the described wire bending means, the same comprising oppositely disposed sets of staggered rolls, each roll provided near each end with an annular groove registering with the like grooves in the other rolls of said sets, said grooves arranged and adapted, as described, to guidingly engage a plurality of wires disposed in pairs spaced a distance apart in both directions with one pair immediately above the other pair, and said rolls arranged and adapted, as described, to bend said plurality of wires concurrently, as the same are fed through said grooves, into concentric rings to thereby form a circular skeleton frame of rectangular cross section, and means for feeding said wire through said grooves.

5. In a machine for making wreaths in which a plurality of wires are fed through the machine to form a skeleton frame body, the combination therewith of means for feeding a cross wire at right angles substantially to and below said first named wires, means for cutting from the free end of said cross wire successively pieces of predetermined length; vertically reciprocating laterally separable V-shaped jaws, a vertically reciprocating V-shaped die operating between said jaws, a vertically reciprocating spreader alined with said die and operating between said jaws and in opposition to said die, vertically reciprocating members positioned one at the side of each jaw and parallel therewith and means for actuating the whole to thereby bend said wire pieces around the wires of the frame body into cross braces for the latter.

6. In an automatic machine for making wreath frames the combination and arrangement of laterally automatically separable wire holding jaws each provided on its inner edge with laterally directed wire holding notches registering with those of the opposite jaw when said jaws are closed together, means for automatically opening and closing said jaws, wire cutters pivotally mounted on said jaws, and, registering with said notches, carried by said jaws in the opening and closing movements of the latter, and means operatively connecting said cutters with the jaw actuating means whereby said cutters are actuated after said jaws are closed together.

7. In an automatic machine for making frames for wreaths, the combination and arrangement of automatically laterally separable jaws each provided on its inner edge with laterally directed wire holding notches arranged and adapted to register with those of the opposite jaw when said jaws are closed together, wire cutters pivotally mounted on and carried by said jaws in the opening and closing movements of the latter, means for automatically opening and closing said jaws, and other means operatively connecting said cutters with the jaw actuating means whereby said cutters are automatically actuated after said jaws are closed together.

CHARLES SMITH.

Witnesses:
  FRED A. SWEET,
  PARKER E. MONROE.